(12) United States Patent
Tisdale et al.

(10) Patent No.: US 10,855,046 B2
(45) Date of Patent: Dec. 1, 2020

(54) NONLINEAR OPTICAL IMAGING

(71) Applicant: Massachusetts Institute of Technology, Cambridge, MA (US)

(72) Inventors: William A. Tisdale, Belmont, MA (US); Yunan Gao, Cambridge, MA (US); Aaron Jacob Goodman, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 110 days.

(21) Appl. No.: 16/159,627

(22) Filed: Oct. 13, 2018

(65) Prior Publication Data

US 2019/0131757 A1    May 2, 2019

Related U.S. Application Data

(60) Provisional application No. 62/573,080, filed on Oct. 16, 2017.

(51) Int. Cl.
| | | |
|---|---|---|
| H01S 3/108 | (2006.01) | |
| G01J 1/04 | (2006.01) | |
| G02F 1/355 | (2006.01) | |
| G02F 1/39 | (2006.01) | |
| H01S 3/30 | (2006.01) | |

(52) U.S. Cl.
CPC .......... *H01S 3/1083* (2013.01); *G01J 1/0459* (2013.01); *G02F 1/3558* (2013.01); *G02F 1/39* (2013.01); *H01S 3/302* (2013.01); *G02F 2001/392* (2013.01)

(58) Field of Classification Search
CPC ...... H01S 3/1083; H01S 3/1086; H01S 3/108; H01S 3/106; H01S 3/302; H01S 3/30; G01J 1/0459; G02F 1/3558; G02F 1/39; G02F 2001/392; G02F 1/395
See application file for complete search history.

(56) References Cited

U.S. PATENT DOCUMENTS

| | | | |
|---|---|---|---|
| 10,132,754 B2* | 11/2018 | Krishnamachari | ........................ G02B 21/0032 |
| 2011/0128538 A1* | 6/2011 | Cerullo | ...................... G01J 3/44 356/301 |
| 2011/0273763 A1* | 11/2011 | Kaertner | .................... G02F 1/39 359/330 |
| 2013/0314767 A1* | 11/2013 | Kuo | ..................... G02B 6/02219 359/330 |
| 2014/0104608 A1* | 4/2014 | Ozeki | ..................... G01N 21/65 356/301 |
| 2014/0333925 A1* | 11/2014 | Boppart | .................. G01N 21/47 356/301 |
| 2014/0361150 A1* | 12/2014 | Cheng | ................... G02B 21/002 250/214 A |
| 2015/0355098 A1* | 12/2015 | Hsieh | ...................... G01N 21/84 250/224 |
| 2017/0082546 A1* | 3/2017 | Dake | ................... G01N 21/6458 |
| 2017/0127947 A1* | 5/2017 | Alfano | .................. A61B 5/0075 |
| 2018/0292377 A1* | 10/2018 | Islam | ..................... G01N 33/02 |
| 2019/0131757 A1* | 5/2019 | Tisdale | .................. G01J 1/0459 |

* cited by examiner

*Primary Examiner* — John R Lee
(74) *Attorney, Agent, or Firm* — Honigman LLP (57) ABSTRACT

Phase modulated Optical Parametric Amplification Imaging (p-OPA), can be used to determine the magnitude and the sign of the second-order nonlinear susceptibility of a material, and its spatial variation.

18 Claims, 8 Drawing Sheets

NONLINEAR OPTICAL IMAGING

CLAIM OF PRIORITY

The application claims priority to U.S. Provisional Application No. 62/573,080, filed Oct. 16, 2017, which is incorporated by reference in its entirety.

STATEMENT OF FEDERAL SUPPORT

This invention was made with Government support under Grant No. W911NF-10-1-0416 awarded by the Army Research Office. The Government has certain rights in the invention.

FIELD OF THE INVENTION

The invention relates to optical imaging systems and methods.

BACKGROUND

Second-order nonlinear optical interactions are useful for probing the electronic and vibrational properties of surfaces and interfaces, measuring time-resolved interfacial dynamics, and studying the structure of biological tissue. Because second-order nonlinear optical processes are dipole forbidden in centrosymmetric media, second-order nonlinear signals are inherently surface and interface selective.

SUMMARY

In general, phase modulated Optical Parametric Amplification Imaging (p-OPA), can be used to determine the magnitude and the sign of the second-order nonlinear susceptibility of a material, and its spatial variation.

In one aspect, a system for detecting optical parametric amplification can include a source of a first laser beam having a first frequency and a second laser beam having a second frequency, wherein the first frequency is two times the second frequency and at least one of the first laser beam and the second laser beam have a modulated phase, a sample holder configured to hold a sample that contacts the first laser beam and the second laser beam, a lock-in amplifier, and a detector configured to detect the first laser beam, the second laser beam, or both after contacting the sample, wherein the lock-in amplifier and detector extract intensity of the detected beam using the modulated phase.

In certain embodiments, the first laser beam can be phase modulated or the second laser beam can be phase modulated. In certain embodiments, the first laser beam and the second laser beam can be phase modulated.

In certain embodiments, the detector can detect the first laser beam after contacting the sample. In certain embodiments, the detector can detect the second laser beam after contacting the sample. In certain embodiments, the detector can detect the first laser beam and the second laser beam after contacting the sample.

In certain embodiments, the lock-in amplifier and detector can extract phase of the detected beam.

In certain embodiments, a display module can display image data from the detected intensity.

In another embodiment, a method of optical parametric amplification can include supplying a first laser beam having a first frequency and a second laser beam having a second frequency, wherein the first frequency is two times the second frequency and at least one of the first laser beam and the second laser beam have a modulated phase, exposing a sample to the first laser beam, the second laser beam, or both, and detecting intensity of the first laser beam, the second laser beam, or both after contacting the sample using the modulated phase.

In certain embodiments, the first laser beam can be phase modulated.

In certain embodiments, the second laser beam can be phase modulated.

In certain embodiments, the first laser beam and the second laser beam can be phase modulated.

In certain embodiments, the first laser beam can be detected after contacting the sample.

In certain embodiments, the second laser beam can be detected after contacting the sample.

In certain embodiments, the first laser beam and the second laser beam can be detected after contacting the sample.

In certain embodiments, detecting can include identifying the phase of a detected beam.

In certain embodiments, the method can include displaying image data from the detected intensity.

Other aspects, embodiments, and features will be apparent from the following description, the drawings, and the claims.

DETAILED DESCRIPTION

Optical interactions allow for a variety of imaging techniques. For example, second-order nonlinear optical interactions, such as sum- and difference-frequency generation, can be used for materials characterization, bioimaging or as selective probes of interfacial environments. These techniques can lead to significant noise due to inefficient nonlinear optical conversion, which can lead to poor signal-to-noise ratio and long signal acquisition times. Enhancement of weak second-order nonlinear optical signals can be achieved via stimulated sum and difference-frequency generation because the process can be highly sensitive to the relative optical phase of the stimulating field. See, for example, A. J. Goodman and W. A. Tisdale, "Enhancement of Second-Order Nonlinear-Optical Signals by Optical Stimulation," Phys. Rev. Lett. 114, 183902 (2015), which is incorporated by reference in its entirety. For instance, vibrational sum frequency generation (SFG) can inform our understanding of chemical bonding at solid surfaces and aqueous interfaces, and time-resolved second harmonic generation (SHG) can be used to study the ultrafast dynamics of charge transfer at donor-acceptor interfaces. In biological tissues, the inherent nonlinearity of second harmonic generation (SHG) enables label-free 3D imaging of protein scaffolds. See, for example, Z. Chen, Y. Shen, and G. Somorjai, Annu. Rev. Phys. Chem. 53, 437 (2002); G. Richmond, Chem. Rev. 102, 2693 (2002); W. Tisdale, K. Williams, B. Timp, D. Norris, E. Aydil, and X.-Y. Zhu, Science 328, 1543 (2010); W.-L. Chan, M. Ligges, A. Jailaubekov, L. Kaake, and X.-Y. Zhu, Science 334, 1541 (2011); D. Vithanage, A. Devizis, A. Abramavicius, Y. Infahsaeng, D. Abramavicius, R. MacKenzie, P. Keivanidis, A. Yartsev, D. Hertel, J. Nelson, V. Sundstrom, and V. Gulbinas, Nat. Commun. 4, 2334 (2013); and X. Chen, O. Nadiamykh, S. Plotnikov, and P. Campagnola, Nat. Protoc. 7, 654 (2012), each of which is incorporated by reference in its entirety.

A new nonlinear optical imaging technique, called phase modulated Optical Parametric Amplification Imaging (p-OPA), can be used to determine the magnitude and the sign of the second-order nonlinear susceptibility of a material, and its spatial variation. The technique can be useful in microelectronics (for example, to determine the orientation 2D transition metal dichalcogenides and other semiconductor materials) and in human health and diagnostics (for example, imaging cancer tissue and the structure of collagen fibrils).

By modulating the phase difference between two incident laser pulses with frequency of $\omega$ and $2\omega$, two degenerate OPA processes of Second Harmonic Generation (SHG) and Difference Frequency Generation (DFG) can be modulated. If a sample is OPA-active, this phase modulation leads to intensity exchange between the two laser pulses. This intensity change, usually small compared to the original incident laser intensity, can be detected and extracted by a photodiode detector and a lock-in amplifier. A system is shown in generalized form in FIG. 1.

Figure 1:
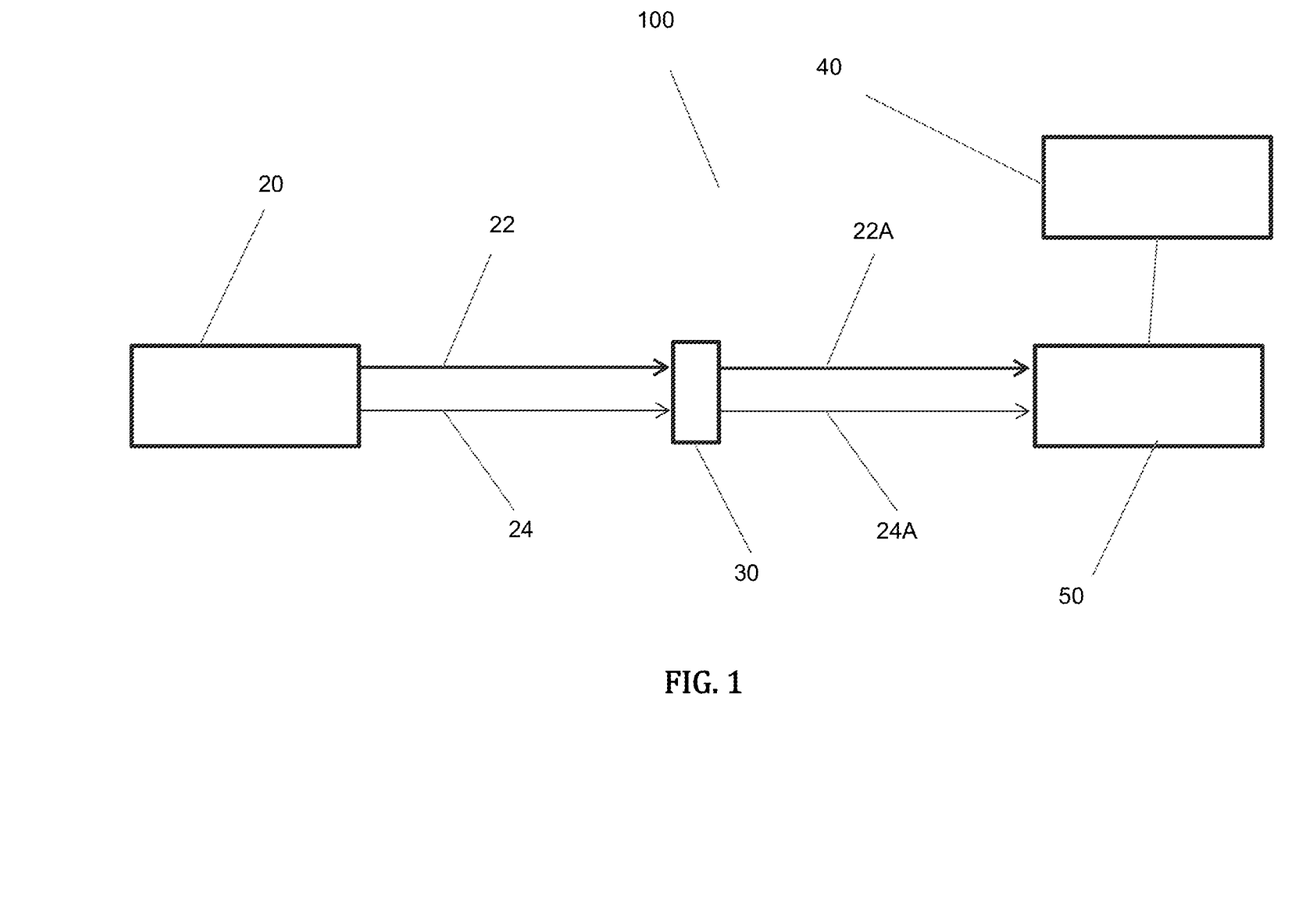
FIG. 1 is a schematic depicting a system described herein.

Referring to FIG. 1, a system for detecting optical parametric amplification 100 includes a source 20 of a first laser beam 22 having a first frequency and a second laser beam 24 having a second frequency. The first laser beam 22 has a first frequency that is two times the second frequency of the second laser beam 24. The first laser beam 22 and the second laser beam 24 have a modulated phase difference that can be controlled by a modulation unit of source 20. The modulation can be of the first laser beam 22, the second laser beam 24, or both. A sample holder 30 is configured to hold a sample (not shown). The first laser beam 22 and the second laser beam 24 contact the sample, which can lead to modifications in the intensity of laser beam 22 as 22A and the intensity of laser beam 24 as 24A. A lock-in amplifier 40 works in conjunction with detector 50 to detect the first laser beam 22A, the second laser beam 24A, or both the first laser beam 22A and the second laser beam 24A after contacting the sample. The lock-in amplifier 40, can utilize the modulated phase difference to enable the and detector to extract intensity of the detected beam using the modulated phase difference. The modulated phase difference can be generated for an electro-optic modulator by a function generator that supplies modulation information to the electro-optic modulator and the lock-in amplifier. The sample holder can include a piezo-electric stage or other device to manipulate the sample allowing for images to be created from the detector intensity data. The laser can be a pulsed laser or a continuous wave laser. The laser beams can be focused or otherwise manipulated to achieve various effects discussed below.

Figure 2:
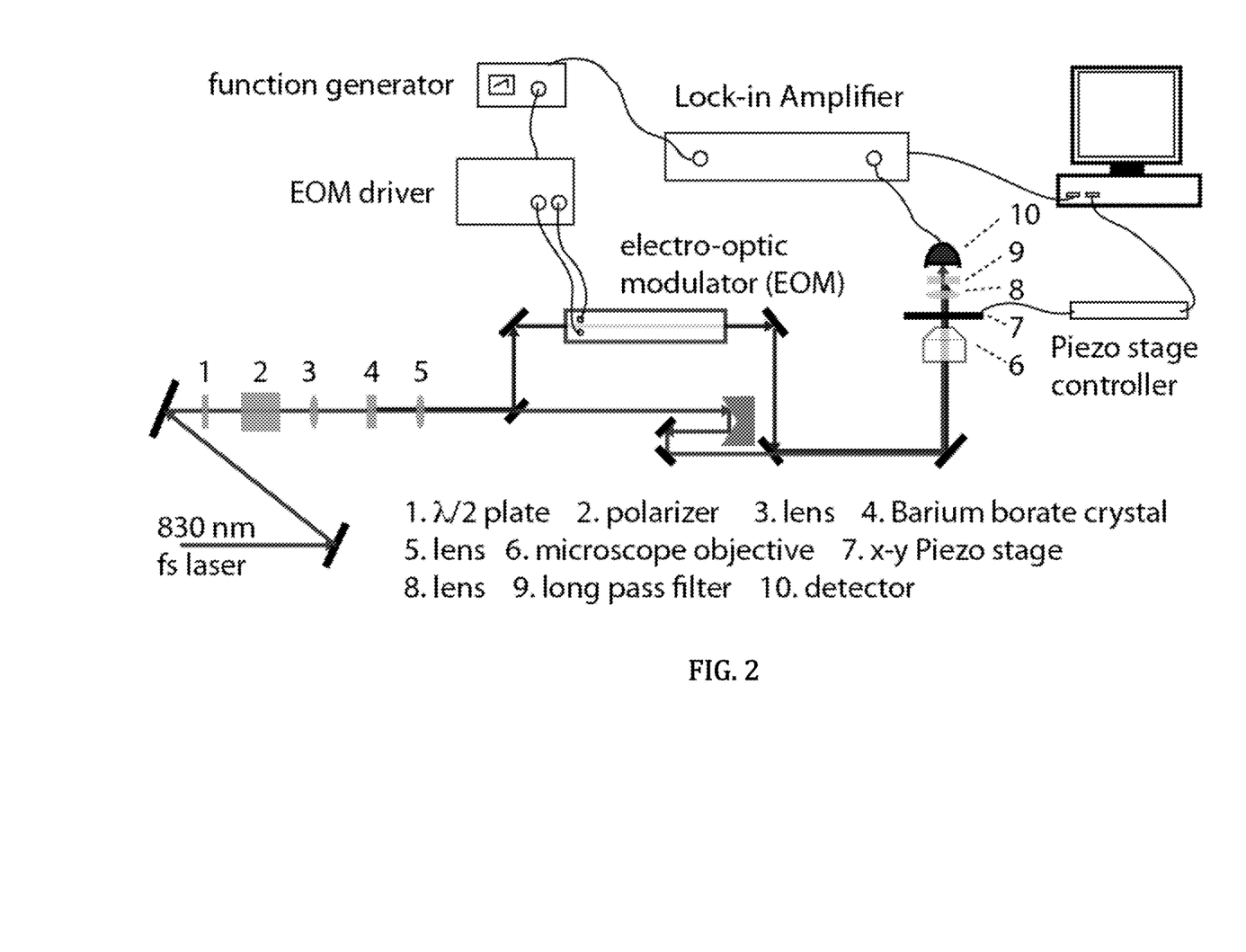
FIG. 2 is a schematic depicting another embodiment of system described herein.

Referring to FIG. 2, a schematic of the system can modulate a 2w frequency laser and detecting a w frequency laser. A schematic of the technique is presented in FIG. 2. In the laser beam path, there can be: mirrors, a beam splitter and a combiner to control laser pulse direction, a half-wave plate (1) and a polarizer (2) to control laser polarization, two lens (3, 5) to focus and collimate the beam, a second harmonic generator (e.g., Barium borate crystal) (4) to generate $2\omega$ laser pulse from the fundamental laser pulse, a EOM to modulate the phase of $2\omega$ laser pulse, a microscope objective (6) to focus laser, a lens (8) to focus laser to a detector (10), a long pass filter (9) to block $2\omega$ laser pulse, and a piezoelectric stage (7) to control sample position. Electronic instruments can include a function generator to generate special saw-tooth wave, a EOM driver to amplify the wave to a desired amplitude, a lock-in amplifier to extract signal, a piezo stage controller to control the piezo stage, and a computer to control the sample stage and to collect data. A display module can be a computer system that can display image data graphically or numerically.

Figure 3:
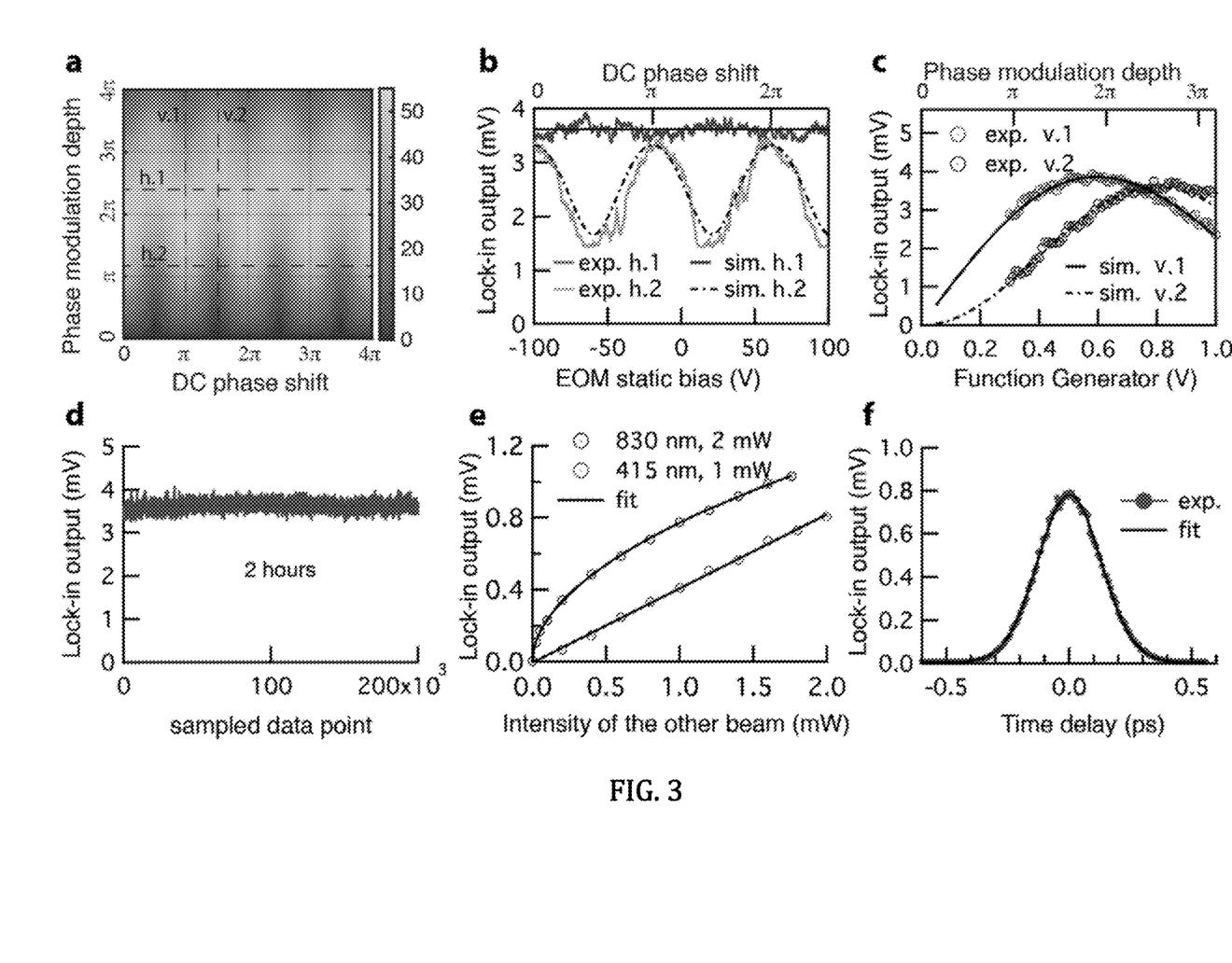
FIG. 3 is a series of graphs depicting simulation and experimental data.
Figure 8:
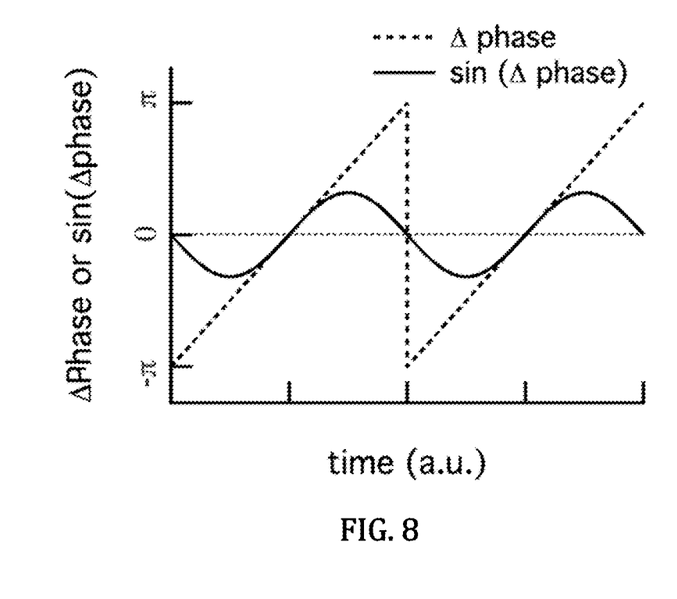
FIG. 8 is a graph depicting an embodiment of a phase modulation pattern.

The technique can use a phase modulation pattern of a 100% asymmetric saw-tooth wave and a carefully chosen peak-to-peak amplitude of the EOM driver output, which is corresponding to a particular phase modulation depth, as shown in FIG. 3 panel a, h.1 position. An example of the phase modulation pattern is shown in FIG. 8 that can be used to create a modulated phase of the laser beam. When these values are chosen, the detected signal is stable as shown in FIG. 3, panel b and panel d. FIG. 3, panel a shows simulated data, and panel b and panel c compare the simulation and experiment results. FIG. 3 panel e shows the signal response curve on laser intensity. FIG. 3 panel f indicates the signal changing on the time delay between two pulses.

FIG. 3 panel a depicts simulation data. FIG. 3 panels b and c depict a comparison between simulation and experimental data along vertical (v.1 and v.2) and horizontal (h.1 and h.2) line cut in panel a. FIG. 3 panel d depicts stability test data. FIG. 3 panel e depicts laser intensity dependence characters. FIG. 3 panel f depicts signal dependence on time delay between tow laser pulses.

Figure 4:
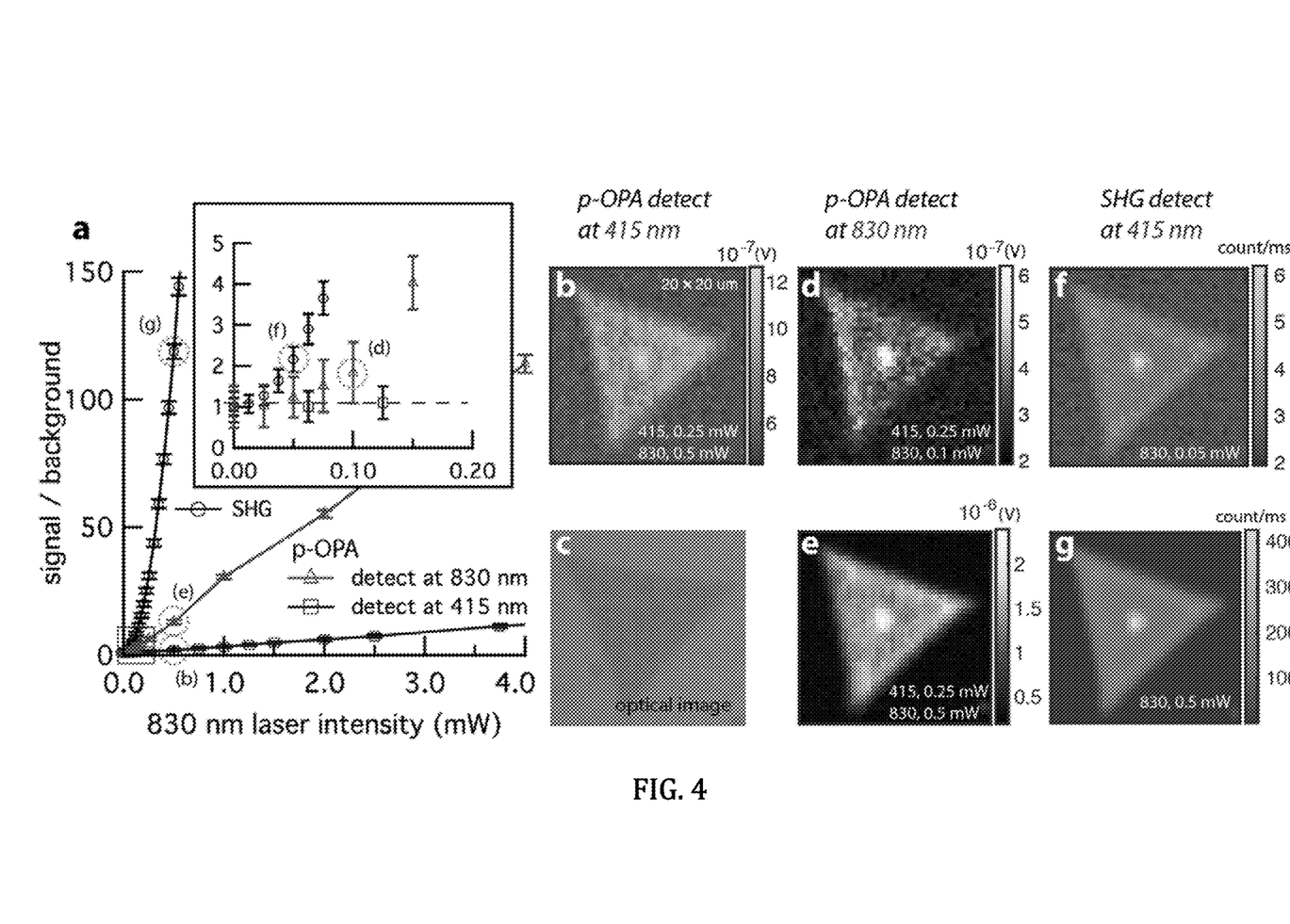
FIG. 4 is a series of a graph and images generated using the system described herein.
Figure 6:
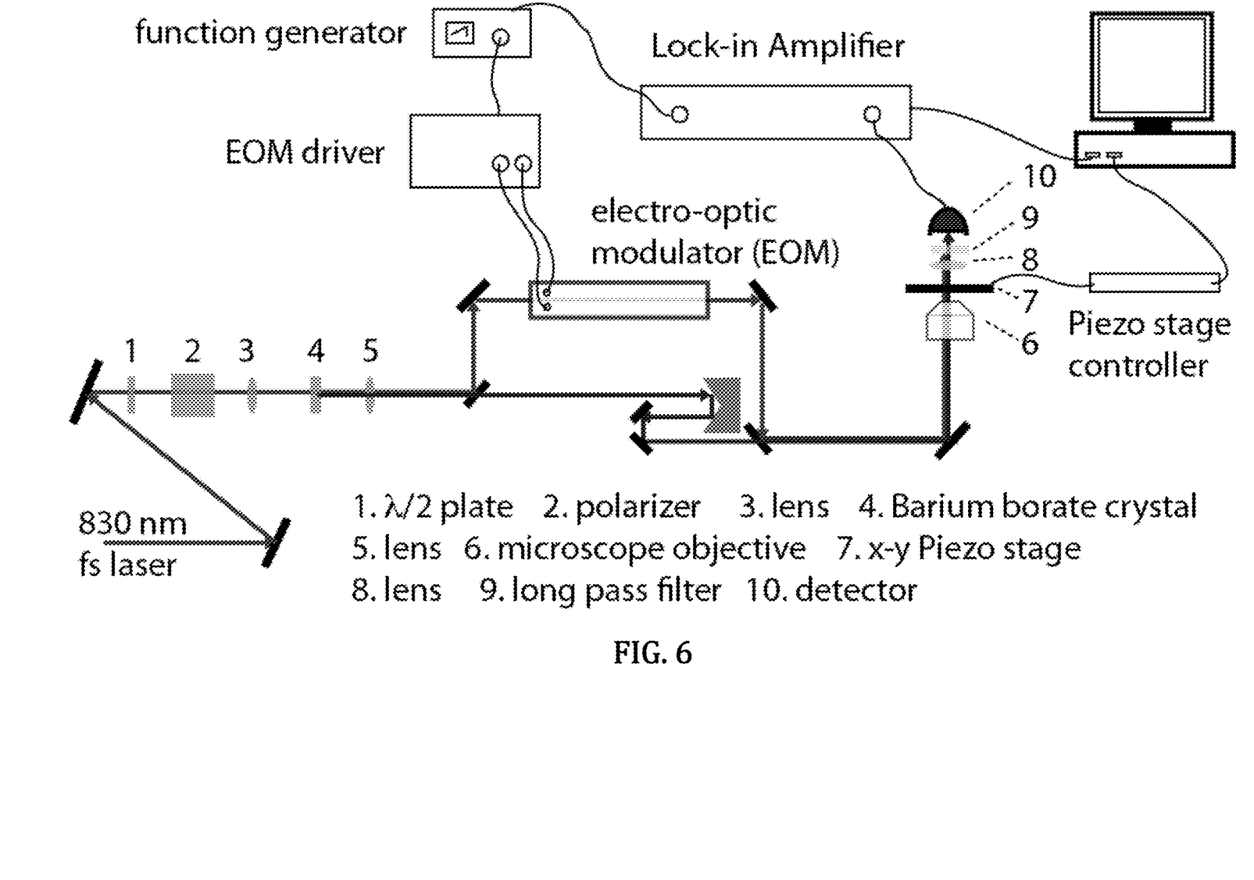
FIG. 6 is a schematic depicting another embodiment of system described herein.

As a first demonstration, the technique has been used to image monolayer $MoS_2$, as shown in FIG. 4 panel b, panel d, and panel e. In FIG. 4 panel b, the fundamental 830 nm laser was modulated and 415 nm laser was detected. For this detection configuration, a second embodiment of the technique was used, as shown in FIG. 6. The two beams between the beam splitter and the combiner were switched, and the long-pass filter was replaced by a short-pass filter. In FIG. 4, monolayers of $MoS_2$ flake were imaged. FIG. 4 panel a depicts a graph showing sensitivity comparison between SHG and two configuration of p-OPA. FIG. 4 panel b is an p-OPA image of the flake by detecting 415 nm laser. FIG. 4 panel c is an optical image of the flake. FIG. 4 panel d and panel e are p-OPA images of the flake by detecting 830 nm laser. FIG. 4 panel f and panel g are SHG images of the flake.

Figure 5:
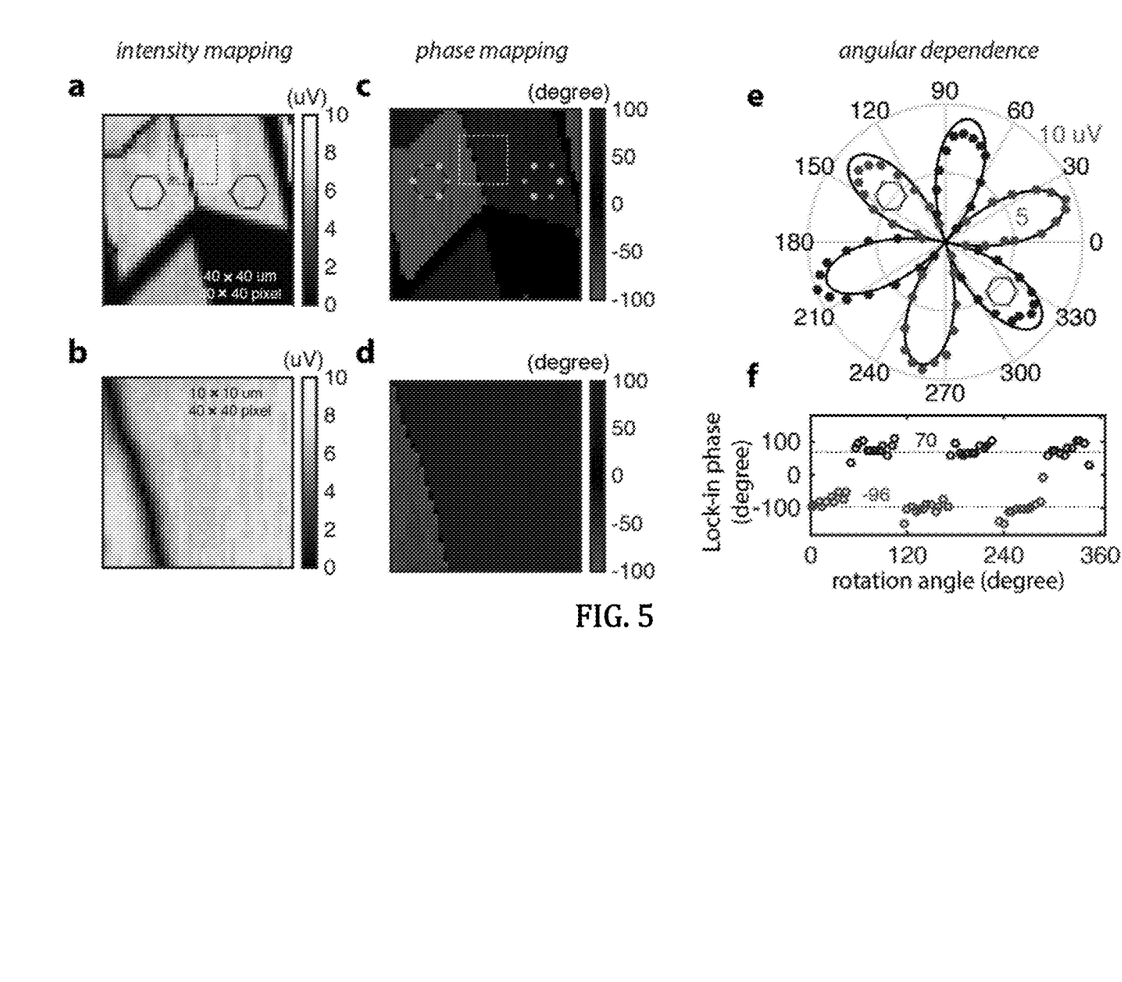
FIG. 5 is a series of graphs and images that depict phase mapping.

This new technique has a unique capability to obtain phase information between SHG and DFG, which can be used to extract a mirror symmetric flip, like in a $MoS_2$ sample, as shown in FIG. 5 panel c, panel d, panel e and panel f FIG. 5 panel a and panel b show intensity mapping of a monolayer $MoS_2$ sample having different domains, which alone cannot distinguish $MoS_2$ with mirror symmetry as illustrated. FIG. 5 panel c and panel d show phase mapping, which show 180 degree lock-in phase change between two domains indicating that they have mirror symmetry. FIG. 5 panel e shows the lock-in intensity change as rotating the $MoS_2$ sample, and FIG. 5 f shows the lock-in phase change as rotating the sample.

More specifically, FIG. 5 shows lock-in intensity and phase mapping of MoS$_2$ flakes with domains and boundaries. FIG. 5 panel a and panel b are images depicting lock-in intensity mapping. FIG. 5 panel c and panel d are images depicting lock-in phase mapping. FIG. 5 panel e is a graph depicting lock-in intensity changes as a MoS$_2$ flake is rotated. FIG. 5 panel f is a graph depicting lock-in phase change as the flake is rotated.

FIG. 6 depicts a schematic of the system for modulate $\omega$ frequency laser and detecting $2\omega$ frequency laser.

Figure 7:
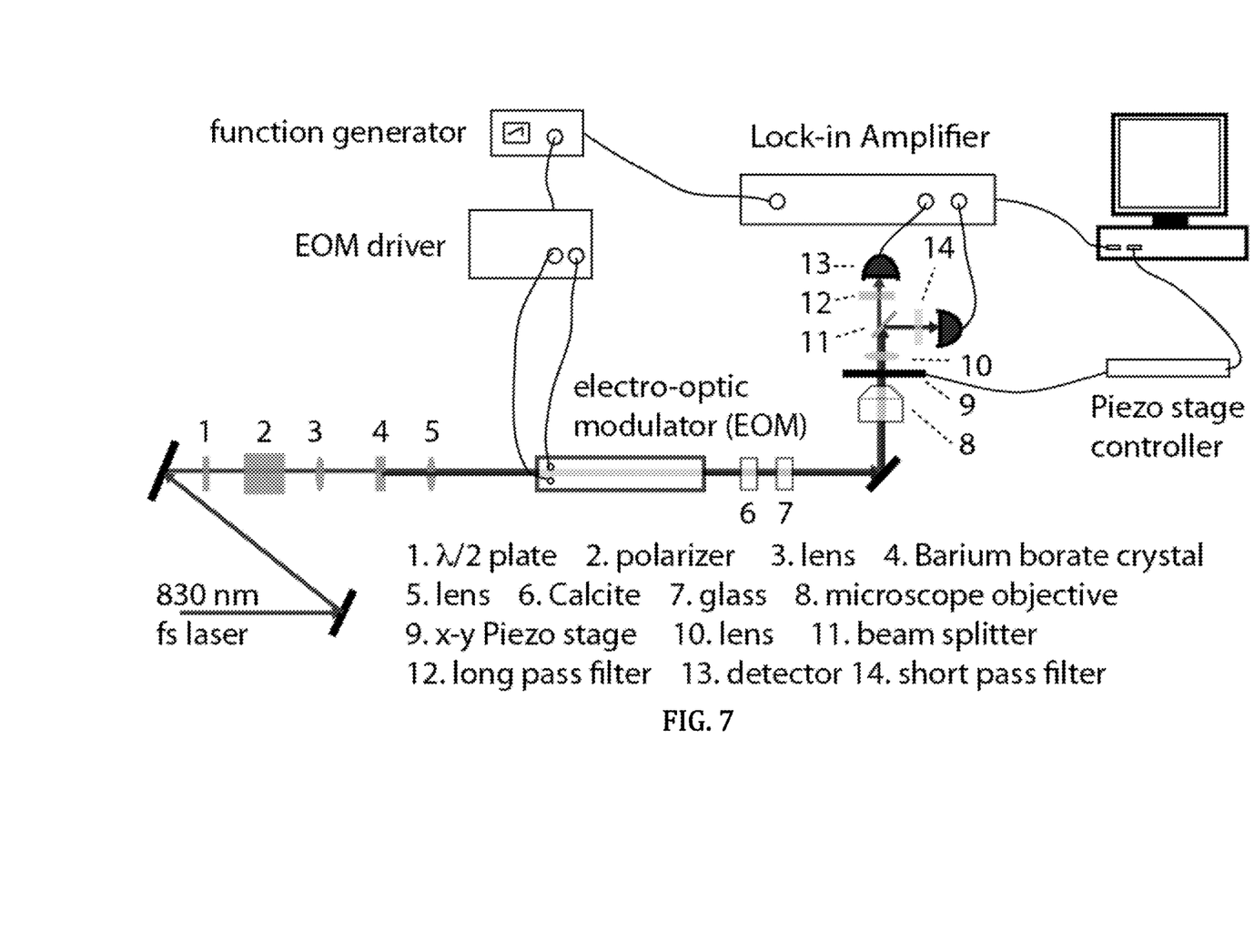
FIG. 7 is a schematic depicting another embodiment of system described herein.

In a third embodiment of the technique (FIG. 7, a schematic of the system for common beam path configuration), the separate beam paths for $\omega$ (red) and $2\omega$ (blue) can be combined into a single common beam path configuration. In this embodiment, the two laser beams (frequency $\omega$ and $2\omega$) both pass through the EOM. Time overlap between two pulses is tuned by Calcite crystals (6) and glass plates (7). In this configuration, a beam splitter is placed before the two detectors, and therefore both laser pulses can be detected simultaneously.

Each of the references cited herein is incorporated by reference in its entirety.

Other embodiments are within the scope of the following claims.

What is claimed is:

1. A system for detecting optical parametric amplification comprising
    a source of a first laser beam having a first frequency and a second laser beam having a second frequency, wherein the first frequency is two times the second frequency and at least one of the first laser beam and the second laser beam have a modulated phase;
    a modulation unit of source that controls the modulated phase of the first laser beam and second laser beam such that if a sample is active for optical parametric amplification, phase modulation leads to intensity exchange between the two laser pulses,
    a sample holder configured to hold a sample that contacts the first laser beam and the second laser beam;
    a lock-in amplifier;
    a detector configured to detect the first laser beam, the second laser beam, or both after contacting the sample, wherein the lock-in amplifier and detector extract intensity of the detected beam using the modulated phase.

2. The system of claim 1, wherein the first laser beam is phase modulated.

3. The system of claim 1, wherein the second laser beam is phase modulated.

4. The system of claim 1, wherein the first laser beam and the second laser beam are phase modulated.

5. The system of claim 1, wherein the detector detects the first laser beam after contacting the sample.

6. The system of claim 1, wherein the detector detects the second laser beam after contacting the sample.

7. The system of claim 1, wherein the detector detects the first laser beam and the second laser beam after contacting the sample.

8. The system of claim 1, wherein the lock-in amplifier and detector extract phase of the detected beam.

9. The system of claim 1, further comprising a display module for displaying image data from the detected intensity.

10. A method of optical parametric amplification comprising
    supplying a first laser beam having a first frequency and a second laser beam having a second frequency, wherein the first frequency is two times the second frequency and at least one of the first laser beam and the second laser beam have a modulated phase;
    exposing a sample to the first laser beam, the second laser beam, or both;
    detecting intensity of the first laser beam, the second laser beam, or both after contacting the sample using the modulated phase.

11. The method of claim 10, wherein the first laser beam is phase modulated.

12. The method of claim 10, wherein the second laser beam is phase modulated.

13. The method of claim 10, wherein the first laser beam and the second laser beam are phase modulated.

14. The method of claim 10, wherein the first laser beam is detected after contacting the sample.

15. The method of claim 10, wherein the second laser beam is detected after contacting the sample.

16. The method of claim 10, wherein the first laser beam and the second laser beam are detected after contacting the sample.

17. The method of claim 10, wherein detecting includes identifying the phase of a detected beam.

18. The method of claim 10, further comprising displaying image data from the detected intensity.

* * * * *

UNITED STATES PATENT AND TRADEMARK OFFICE
CERTIFICATE OF CORRECTION

Page 1 of 1

| | |
|---|---|
| PATENT NO. | : 10,855,046 B2 |
| APPLICATION NO. | : 16/159627 |
| DATED | : December 1, 2020 |
| INVENTOR(S) | : Tisdale et al. |

It is certified that error appears in the above-identified patent and that said Letters Patent is hereby corrected as shown below:

In the Specification

In Column 1, Lines 7-10, delete:
"This invention was made with Government support under Grant No. W911NF-10-1-0416 awarded by the Army Research Office. The Government has certain rights in the invention."

And insert:
-- This invention was made with government support under DE-SC0010538 awarded by the U.S. Department of Energy, and W911NF-10-1-0416 awarded by the U.S. Army Research Office. The government has certain rights in the invention. --

Signed and Sealed this
Ninth Day of December, 2025

John A. Squires
*Director of the United States Patent and Trademark Office*